US010833526B2

United States Patent
Thiel et al.

(10) Patent No.: US 10,833,526 B2
(45) Date of Patent: Nov. 10, 2020

(54) CHARGING APPARATUS FOR WIRELESSLY CHARGING A RECHARGEABLE ELECTRICAL ENERGY STORE OF A MOBILE TERMINAL

(71) Applicants: Audi AG, Ingolstadt (DE); Novero Dabendorf GmbH, Dabendorf (DE)

(72) Inventors: Holger Thiel, Wettstetten (DE); Frank Scholz, Berlin (DE)

(73) Assignee: Audi AG, Ingolstadt (DE)

( * ) Notice: Subject to any disclaimer, the term of this patent is extended or adjusted under 35 U.S.C. 154(b) by 26 days.

(21) Appl. No.: 16/330,707

(22) PCT Filed: Jul. 3, 2017

(86) PCT No.: PCT/EP2017/066453
§ 371 (c)(1),
(2) Date: Mar. 5, 2019

(87) PCT Pub. No.: WO2018/046156
PCT Pub. Date: Mar. 15, 2018

(65) Prior Publication Data
US 2020/0021125 A1  Jan. 16, 2020

(30) Foreign Application Priority Data

Sep. 6, 2016 (DE) .......................... 10 2016 216 900

(51) Int. Cl.
*H02J 50/12* (2016.01)
*H02J 7/02* (2016.01)
(Continued)

(52) U.S. Cl.
CPC .............. *H02J 7/025* (2013.01); *H02J 50/12* (2016.02); *H04B 1/036* (2013.01); *H02J 7/00034* (2020.01)

(58) Field of Classification Search
CPC ................................ H02J 50/10; H02J 50/12
(Continued)

(56) References Cited

U.S. PATENT DOCUMENTS 9,035,949 B1\* 5/2015 Oberheu ............... G06T 11/206
                                                      345/440
9,380,971 B2  7/2016 He
(Continued)

FOREIGN PATENT DOCUMENTS

CN       201262129 Y     6/2009
CN       101971453 A     2/2011
(Continued)

OTHER PUBLICATIONS

International Search Report and Written Opinion of the International Searching Authority directed to related International Patent Application No. PCT/EP2017/066453, dated Aug. 31, 2017, with attached English-language translation; 22 pages.
(Continued)

*Primary Examiner* — Hai L Nguyen
(74) *Attorney, Agent, or Firm* — Sterne, Kessler, Goldstein & Fox P.L.L.C.

(57) ABSTRACT

The present disclosure relates to a charging apparatus for wirelessly charging a rechargeable electric energy store of a mobile terminal, having a housing, a primary coil device and a first control device operatively connected thereto, wherein the first control device is arranged in the housing, which has at least one air entry opening and at least one air exit opening. The housing further has a heat sink arranged in it that has an associated active air supply device, wherein the air supply device is set up to actively supply the heat sink with ambient air that can flow in, at least also through the at least one air entry opening. The heat sink has an associated temperature sensor device for sensing the temperature of the
(Continued)

heat sink. The charging apparatus further has a second control device that has a signal connection to the temperature sensor device and is operatively coupled to the active air supply device, and that is set up to be able to activate the active air supply device as soon as and for as long as a predetermined first limit temperature of the heat sink has been reached or exceeded. Furthermore, the second control device also has a signal connection to the first control device and is set up to activate the active air supply device when the first limit temperature of the heat sink is reached or exceeded, and wireless charging of an electrical energy store of a mobile terminal is also performed.

10 Claims, 3 Drawing Sheets

(51) Int. Cl.
 *H04B 1/036* (2006.01)
 *H02J 7/00* (2006.01)
(58) Field of Classification Search
 USPC .......................................................... 307/104
 See application file for complete search history.

(56) References Cited

U.S. PATENT DOCUMENTS

| | | | |
|---|---|---|---|
| 9,698,607 B2 * | 7/2017 | Kesler | H02J 5/005 |
| 9,722,447 B2 * | 8/2017 | Partovi | H02J 50/12 |
| 10,044,229 B2 | 8/2018 | Partovi et al. | |
| 2011/0148352 A1 | 6/2011 | Wang et al. | |
| 2013/0242080 A1 | 9/2013 | Kossin | |
| 2013/0319640 A1 | 12/2013 | Cavallaro et al. | |
| 2016/0276866 A1 | 9/2016 | Lachnitt et al. | |
| 2017/0225582 A1 | 8/2017 | Augst et al. | |

FOREIGN PATENT DOCUMENTS

| | | |
|---|---|---|
| CN | 103956785 A | 7/2014 |
| CN | 104852630 A | 8/2015 |
| CN | 104999944 A | 10/2015 |
| CN | 204696773 U | 10/2015 |
| DE | 10114639 A1 | 9/2002 |
| DE | 102014009724 A1 | 12/2014 |
| DE | 102015112127 A1 | 9/2016 |
| EP | 2988424 A1 | 2/2016 |
| WO | WO-9724911 A1 | 7/1997 |

OTHER PUBLICATIONS

International Preliminary Report on Patentability directed to related International Patent Application No. PCT/EP2017/066453, dated Mar. 12, 2019, with attached English-language translation; 14 pages.
Chinese Application No. 201780054260.9, Office Action dated Aug. 3, 2020; 6 pages.

* cited by examiner

CHARGING APPARATUS FOR WIRELESSLY CHARGING A RECHARGEABLE ELECTRICAL ENERGY STORE OF A MOBILE TERMINAL

TECHNICAL FIELD

The disclosure relates to a charging apparatus for wirelessly charging a rechargeable electrical energy store of a mobile terminal, and a vehicle having the charging apparatus.

BACKGROUND

Devices and methods for charging an electrical energy store (for example, an accumulator, a rechargeable battery, a supercapacitor, etc.) of a mobile terminal, such as a mobile telephone, a tablet PC, etc., by means of a wireless energy transmission have been known for some time.

Currently, most prevalent are devices and methods for inductive energy transfer, e.g., those according to the Qi standard. In addition, devices and methods for a wireless energy transmission by means of a resonant magnetic coupling are known, e.g., those according to the Rezence standard.

With both methods, an alternating magnetic field is generated by means of one or more primary coils, the alternating magnetic field, by way of a mutual induction, inducing an alternating voltage in one or more secondary coils, which are present in the mobile terminal and spatially separate from the primary coil(s) by a transmission path. The thus generated alternating current is rectified in the mobile terminal and used for charging the rechargeable energy store present therein.

Due to the transmission path, the magnetic coupling between the coils is less than the case, for example, with a transformer, resulting in a lower induced voltage in the secondary coil(s) and a reduced power transfer, when compared to a transformer.

In both methods, the energy is thus transmitted wirelessly with a lower efficiency than the case with a wired energy transmission, resulting in the fact that at a comparable charging current intensity, a higher heat loss is generated with a wireless energy transmission than with a wired energy transmission.

This can also result in a significant heating of both the mobile terminal and the charging apparatus, on which the mobile terminal is placed during the charging process. In addition to the inherent heating of the mobile terminal itself, the mobile terminal can additionally also be heated by the charging apparatus during the wireless charging process.

As is known, mobile terminals, such as mobile telephone and tablet PCs, have their own temperature control, by means of which the processor power is reduced and/or the charging current intensity is limited, when a predetermined limit temperature is reached or exceeded. If the limit temperature is exceeded by a predetermined value, the mobile terminals are completely deactivated in order to prevent damage to the mobile terminal or components thereof.

As was determined by the inventors, a wireless charging while simultaneously performing functions, such as telephony via Bluetooth® and WLAN, and use of the mobile terminal in connection with the multimedia interface, can cause a heating of the mobile terminal (e.g. mobile telephones, smartphones) of up to 55° Celsius.

However, the ideal operating temperature for a lithium-ion battery lies in the range from approximately 15° C. to approximately 25° C., and at a temperature>40° C., it can lose up to 35% of its capacity within a year.

In order to ensure the functioning of a mobile terminal, including the charging of its rechargeable electric energy store even during a wireless energy transmission and to contribute to the conservation of the rechargeable electric energy store, it is thus desirable to discharge from the mobile terminal at least to some extent the lost heat generated in the mobile terminal and the charging apparatus.

US 2011/0148352 A1 describes a holding device for holding a mobile terminal and Bluetooth® headphones. The holding device can be designed to wirelessly charge an electric energy store of the mobile terminal. By means of clipping, the holding device can be fastened to the air outlet lamellas of an air conditioning system of a motor vehicle.

From CN 204696773 U, a wireless charging system with a primary coil for recharging an electric energy store of a mobile terminal is known. The inductive charging system can be cooled by means of an axial fan in order to prevent high temperatures during the wireless charging, while executing a navigation, or a different operational state with high load.

The subject matter of CN 104999944 A is a central armrest of a vehicle with a wireless charging system for recharging an electric energy store of a mobile terminal. In the receiving space for the mobile terminal, an outlet of the air conditioning system of the vehicle is arranged.

DE 10 2014 009 724 A1 describes a charging apparatus for a motor vehicle having at least one charging unit for charging an electronic device, particularly a mobile phone, and a supporting surface for receiving the electronic device, wherein, between the charging unit and the supporting surface, an essentially wave-shaped structural element with a multiplicity of openings is arranged, through which cooling air introduced into the charging apparatus can flow.

And the subject matter of DE 101 14 639 A1 is a device for cooling heat-generating electronic components, including a cooling body associated with the component and provided with cooling ribs, and a fan mounted on the cooling body and connected to a direct current supply line. In order to be able to change the speed of the fan on the basis of the heat quantity generated and the associated heat quantity to be discharged, a circuit board is fitted onto a cooling rib of the cooling body, and a temperature-controllable resistance inserted into the direct current supply line and a temperature sensor for controlling the resistance and located near the cooling rib are arranged on the circuit board.

BRIEF DESCRIPTION OF THE DRAWINGS/FIGURES

DETAILED DESCRIPTION

Figure 1:
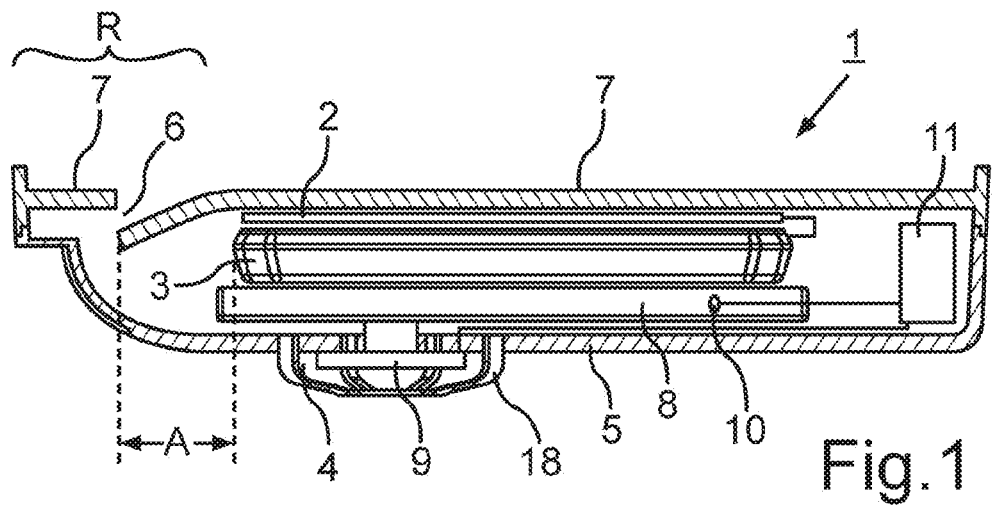
FIG. 1 shows a cross-sectional view of a charging apparatus, as discussed below in the disclosure.

The problem addressed by the present disclosure is that of providing a charging apparatus which is improved, when compared to the prior art, for wirelessly charging a rechargeable electrical energy store of a mobile terminal. A further problem addressed by the present disclosure is that of providing a vehicle having the charging apparatus according to the present disclosure. These problems are solved by the features of the claims. Advantageous developments and embodiments of the disclosure are subject matter of the claims and can be found in the description, the drawings, and the description of the drawings.

According to the disclosure, a charging apparatus for wirelessly charging a rechargeable electrical energy store of a mobile terminal is proposed, having a primary coil device and having a first control device operatively connected thereto at least for controlling the intensity and duration of the alternating magnetic field generable by the primary coil device, wherein the first control device is arranged in a housing, which has at least one air entry opening and at least one air exit opening, wherein the at least one air exit opening of the housing is arranged in one side of the housing, the outer side of which serves at least to some extent as supporting surface for the mobile terminal and is designed such that air flowing from the housing of the charging apparatus is guided in the direction of a mobile terminal lying on the supporting surface.

The charging apparatus according to the disclosure is characterized in that a heat sink is further arranged in the housing, wherein the heat sink has an associated air supply device that is set up to actively supply the heat sink with ambient air that can flow in, at least also through the at least one air entry opening.

In some embodiments, the heat sink has an associated temperature sensor device for sensing the temperature of the heat sink.

In some embodiments, the charging apparatus has a second control device that has a signal connection to the temperature sensor device and is operatively coupled to the active air supply device, and that is set up to be able to activate the active air supply device as soon as and for as long as a predetermined first limit temperature of the heat sink has been reached or exceeded.

In some embodiments, the second control device also has a signal connection to the first control device and is set up to activate the active air supply device only if, when or after the first limit temperature of the heat sink is reached or exceeded, wireless charging of an electrical energy store of a mobile terminal is also performed.

The charging apparatus according to the disclosure results in the advantage that its components, but particularly the first control device and the housing as well as the mobile terminal, can be cooled basically passively by the heat sink and are cooled actively only when needed, resulting in advantages with regard to the energy consumption associated with the cooling and the noise generation associated with the cooling. When compared to the solutions known from the prior art, in which a cooling takes place by using an air conditioning system, the ambient air flowing from the charging apparatus, according to the disclosure, under active cooling is often perceived by users as more pleasant than the air emitted by an air conditioning system which by comparison is usually significantly cooler than the temperature of the ambient air.

As already mentioned above, modern mobile terminals have a self-protection function in order to prevent a possibly damaging heating by the operation of the mobile terminal (e.g., due to the execution of one or more computation-intensive programs) and/or due to a charging of the electric energy store present in the mobile terminal. Insofar, it is not the primary task of the charging apparatus according to the present disclosure to protect the mobile terminal from thermal damage; instead, the primary task of the charging apparatus according to the present disclosure is that of ensuring a preferably uninterrupted operation of the mobile terminal and/or a sufficiently quick wireless charging of the rechargeable electric energy store present in the mobile terminal.

With mobile terminals, it can be assumed as a rule that, even if one or more computation-intensive programs are executed, the mobile terminal does not heat up to a point that causes it to deactivate itself or reduces its processing power to an undesirable low level. This applies particularly to an environment, such as a modern motor vehicle, in which moderate interior temperatures are ensured during its operation by means of an air-conditioning system even at high outdoor temperatures.

However, if, for example, the execution of one or more computation-intensive programs takes place simultaneously during a wireless charging of the electric energy store present in the mobile terminal, the lost heat thus generated can increase the temperature of the mobile terminal even in such an environment that it deactivates itself automatically or reduces the processing power and/or the charging current intensity to an undesirably low level.

Against this background, it can in many cases be sufficient if the active air supply device in the charging apparatus according to the disclosure is activated only as long as it is determined by the second control device (e.g., by receiving and possibly analyzing a signal received from the first control device) that a wireless charging process is taking place while the first limit temperature of the heat sink is simultaneously reached or exceeded.

According to a first advantageous development of the charging apparatus, it can further include a presence sensor which is set up to determine whether an object is present on the supporting surface of the housing. The presence sensor has a signal connection to the second control device.

In the charging apparatus according to the present disclosure, the second control device can advantageously also be set up to again deactivate the air supply device only, when a predetermined second limit temperature of the heat sink, which is lower than the first limit temperature, is reached or undercut.

In some embodiments, the second control device can be set up to not activate the active air supply device or to deactivate it, when the presence sensor senses that no object is present on the supporting surface of the housing.

In the charging apparatus according to the present disclosure, it can furthermore be provided that the active air supply device is arranged in the at least one air entry opening of the housing. This results in a particularly compact design of the charging apparatus.

It is further advantageous if the at least one air exit opening in the charging apparatus, according to the present disclosure, is arranged in a predetermined edge area R of the side of the housing, the outer side of which serves at least to some extent as a supporting surface for the mobile terminal, such that, in an installation state of the housing, the at least one air exit opening is offset by a predetermined distance value A horizontally with regard to the part of the first control device that comes closest to the at least one air exit opening.

In the charging apparatus according to the present disclosure, the at least one air exit opening can advantageously also be designed such that the flow direction of the air exiting from it has an acute angle relative to the supporting surface.

In order to ensure a flow of the air exiting from the at least one air exit opening between the supporting surface of the charging apparatus and a mobile terminal lying on the supporting surface, the supporting surface can advantageously have spacer elements which ensure a predetermined distance between the supporting surface and a supporting side of the mobile terminal.

In order to increase the ability of the heat sink to dissipate heat, it can also include cooling ribs, cooling fins and/or cooling pins which, in an installation state of the heat sink, are arranged on the side of the heat sink which faces away from the first control device.

According to some embodiments of the charging apparatus, the primary coil device can be arranged in an installation state adjacent to the first control device and/or the primary coil device can be an element of the side of the housing, the outer side of which serves at least to some extent as the supporting surface for the mobile terminal.

In some embodiments, the charging apparatus can further include a mobile communications antenna device which is arranged in the housing or which can be an element of the side of the housing, the outer side of which serves at least to some extent as the supporting surface for the mobile terminal.

In some embodiments, the charging apparatus can include an associated microphone device for detecting the volume in an environment of the charging apparatus, and the second control device can have a signal connection to the microphone device and be set up to control the active air supply device also on the basis of the volume in the environment of the charging apparatus.

The present disclosure also includes a vehicle, particularly a motor vehicle, having a charging apparatus according to the disclosure or one of its advantageous developments or embodiments.

The present disclosure also includes methods for operating the charging apparatus and the vehicle as they can be readily derived by a person skilled in the art from the present description, the claims, the drawings and the description of the drawings.

In the following, some preferred embodiments of the disclosure shall be described.

FIG. 1 shows a cross-sectional view of a charging apparatus as discussed below in the disclosure.

Figure 2:
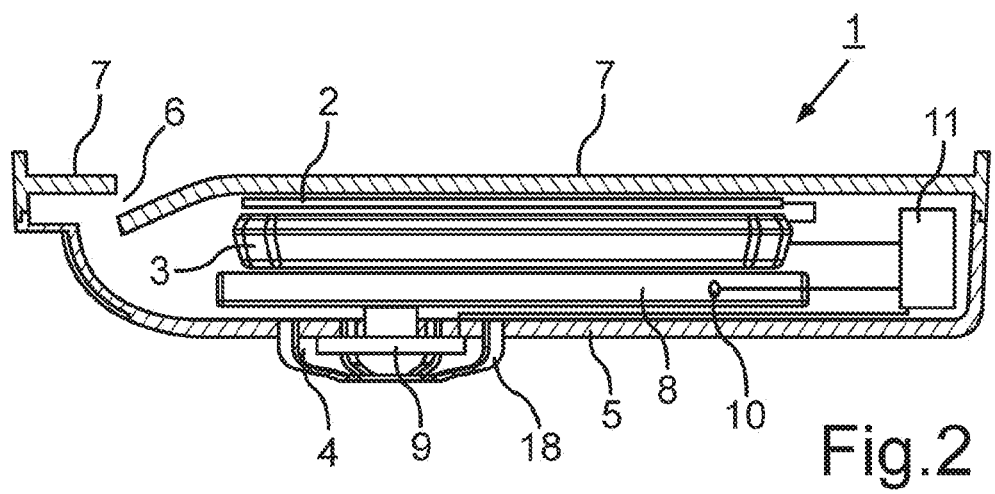
FIG. 2 shows a cross-sectional view of a charging apparatus, according to a first embodiment of the present disclosure.

FIG. 2 shows a cross-sectional view of a first embodiment of a charging apparatus according to the present disclosure.

Figure 3:
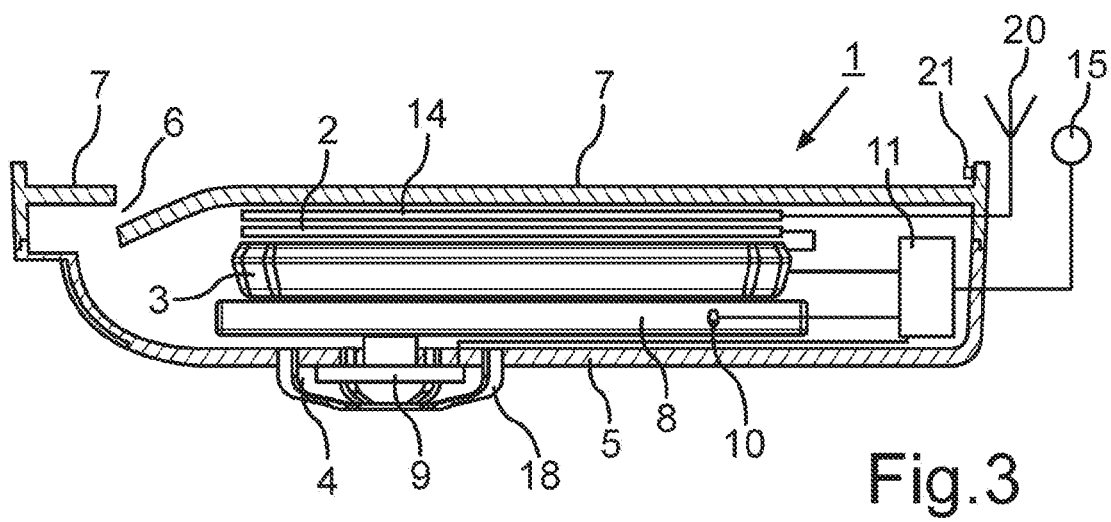
FIG. 3 shows a cross-sectional view of a charging apparatus, according to a second embodiment of the present disclosure.

FIG. 3 shows a cross-sectional view of a second embodiment of a charging apparatus according to the present disclosure.

Figure 4:
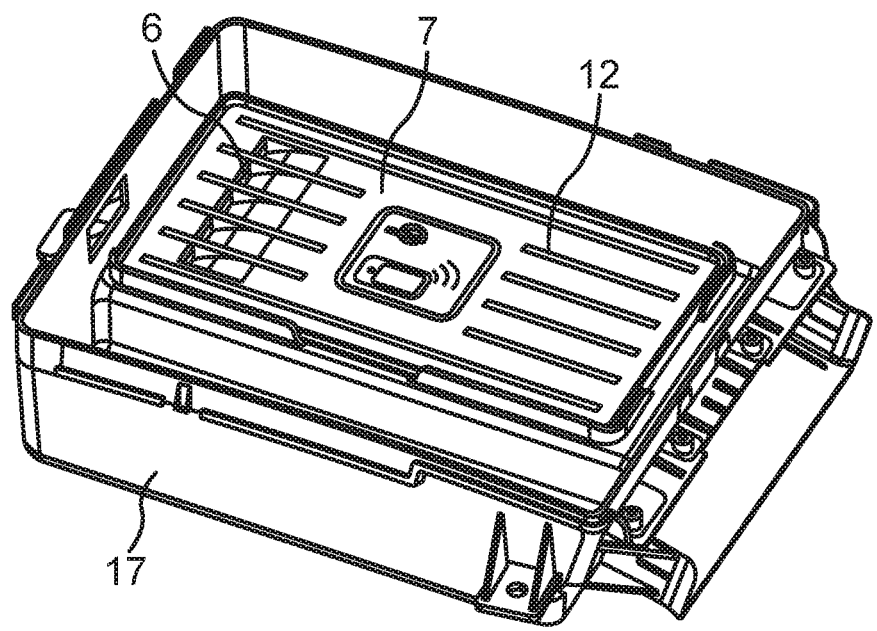
FIG. 4 shows a top view of a charging apparatus arranged in an installation shaft, according to some embodiments of the present disclosure.

FIG. 4 shows a top view of an embodiment of a charging apparatus according to the present disclosure, arranged in an installation shaft.

Figure 5:
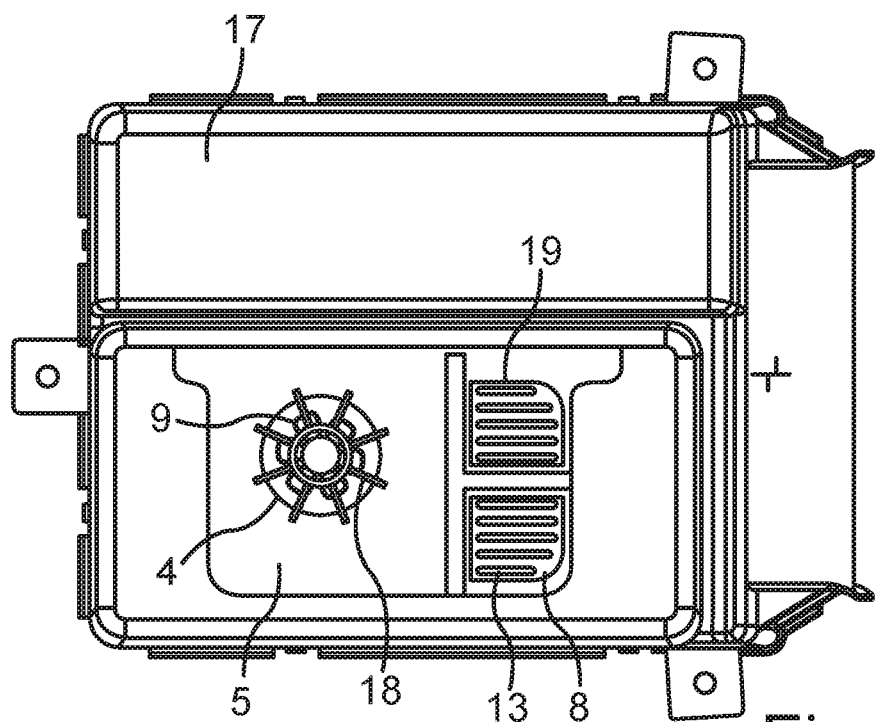
FIG. 5 shows a view from below of a charging apparatus arranged in an installation shaft, according to some embodiments of the present disclosure.

FIG. 5 shows a view from below of a charging apparatus according to the present disclosure, arranged in an installation shaft.

Figure 6:
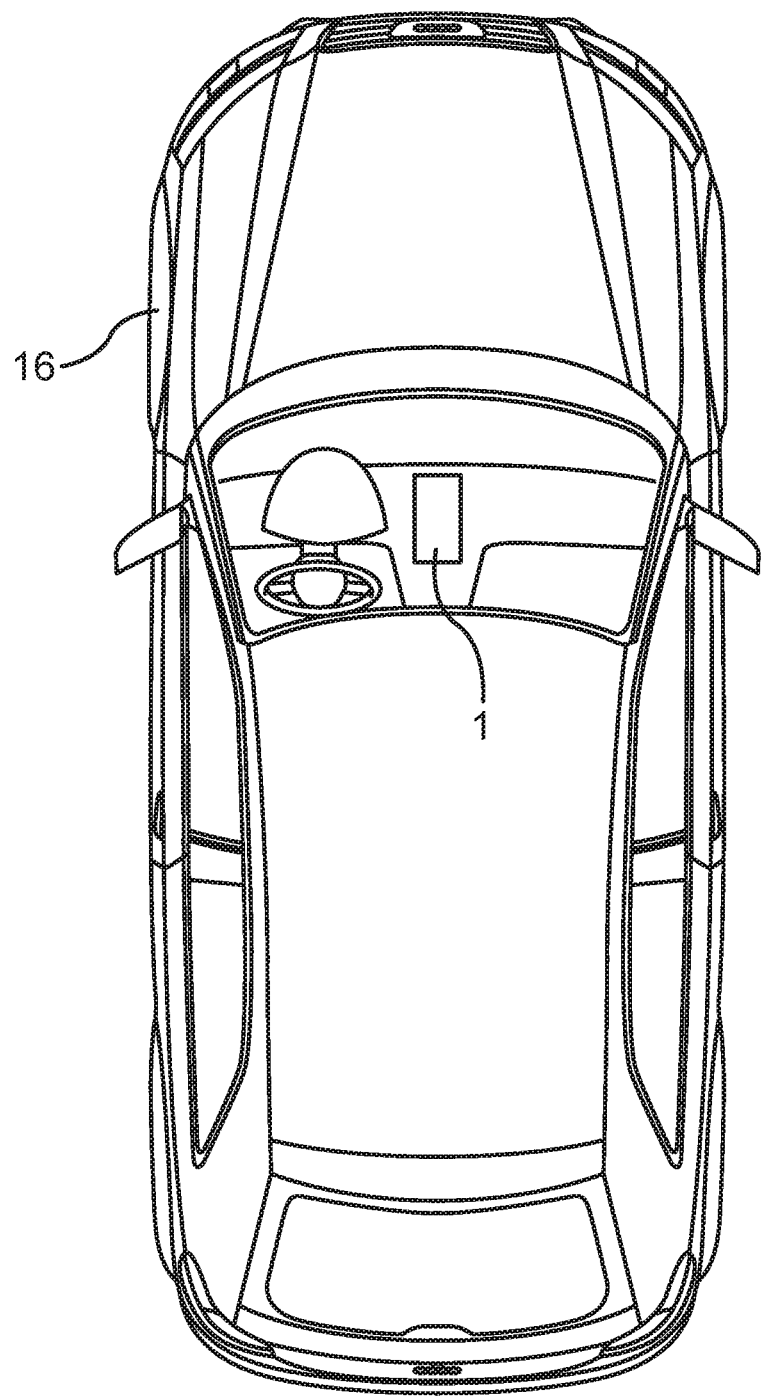
FIG. 6 shows a schematic view of a motor vehicle having a charging apparatus, according to some embodiments of the present disclosure.

FIG. 6 shows a schematic view of a motor vehicle having a charging apparatus according to the present disclosure.

The representations in the drawings are purely schematic and not true to scale. Within the drawings, the same or similar elements are denoted with the same reference signs.

The embodiments described in the following are preferred embodiments of the present disclosure. The present disclosure is naturally not limited to these embodiments.

The features and combination of features stated in the above description and the features and combination of features stated in the following description of embodiments and the description of the drawings and/or shown in isolation in the drawings can be used not only in the respectively described combination but also in other combinations or in isolation without exceeding the scope of the present disclosure.

In the following description, the detailed explanation and description of components, assemblies, devices, etc. of the charging apparatus and their interaction is quite predominantly foregone because they are common general knowledge for a person skilled in the art. For the present application, it is thus assumed that the basic principles of the different possibilities of wireless charging of energy stores of mobile terminals, the type of components, assemblies, device, etc. that must or can for that purpose be present on the primary and secondary side, and how they possibly interact and/or communicate during a process of wireless charging, is known to a person skilled in the art.

The spatial arrangements of the components, assemblies, devices, etc. of the charging apparatus and their arrangement to one another shown in the drawings are to be seen as purely exemplifying. However, charging apparatuses which include the arrangement of the components, assemblies, devices, etc. and their arrangement to one another shown in the drawings can preferably be part of the present disclosure.

In FIGS. 4 and 5, a charging apparatus 1 is shown arranged in an installation shaft 17. This representation merely serves as an illustration as to how the charging apparatus 1, e.g., can be installed in a (motor) vehicle. The installation shaft 17 is not part of the charging apparatus 1 according to the present disclosure.

As is shown exemplarily in FIG. 1, the charging apparatus 1 according to the present disclosure has a primary coil device 2 and a first control device 3 operatively connected thereto at least for controlling the intensity and duration of the alternating magnetic field generable by the primary coil device 2, wherein the first control device 3 is arranged in a housing 5 which in the depicted embodiment is formed by a lower shell, having at least one air entry opening 4, and a "lid," having at least one air exit opening 6, which is or can be connected to the lower shell, and the outer side of which serves at least to some extent as a supporting surface 7 for the mobile terminal.

It can be advantageous if the "lid" (the upper cover of the lower shell) is detachably connected to the lower shell in order to be able to possibly replace the upper cover in an easy manner, to provide the supporting surface 7 adjusted as optimally as possible to the size (surface) of specific mobile terminals, to be able to meet specific color and/or haptic preferences of customers, or to be able to replace damaged or (permanently) soiled support surfaces in a cost-efficient manner.

However, the housing 5 does not have to be designed in the manner shown in FIGS. 1 to 3, and, for example, the lower shell can be integral with the supporting surface, wherein in such case, a closable opening can be provided, for example, on a sidewall of the lower shell.

The primary coil device 2 can include 1, 2, 3 or more primary coils (not shown in the drawings for reasons of clarity) which, in case of a multiplicity of primary coils, are arranged adjacent to one another. As is shown exemplarily in FIGS. 1 to 3, the primary coil device 2 can be arranged in the housing 5 of the charging apparatus 1 but can also be a component of the side of the housing 5, the outer side of which serves at least to some extent as the supporting surface 7 for the mobile terminal.

For ensuring the electromagnetic compatibility, the first control device 3 can be arranged in a suitable housing (and in FIGS. 1 to 3, the first control device 3 is shown in such a housing). It is known that in the different standards for wireless charging of electric energy stores of mobile terminals, the mobile terminal and a control device (herein the first control device 3) frequently communicate such that the mobile terminal requests the admissible charging current intensity and the control device (herein the first control device 3) controls the primary coil device 2 according to the charging current intensity requested. If necessary, the first control device 3 thus has the required communication and control devices.

The housing 5 of the charging apparatus 1 can be made of any suitable material, e.g., of a plastic, of a plurality of different plastics, of a composite material, of a plurality of different composite materials, etc. Since only the part of the side of the housing 5, which with its outer side serves as the supporting surface 7 for the mobile terminal, must be permeable for the alternating magnetic fields generated by the primary coil device 2, it is thus only necessary that this particular part is made of a corresponding, suitable material.

The outer side of the housing 5, at least part of which serves as the supporting surface 7 for the mobile terminal, can, even if this is not shown in the drawings, naturally also include, e.g., retaining arms or retaining brackets which are designed to be movable against a spring force and/or (detachably) fastened at different positions on the supporting surface 7 in order to ensure a secure retaining and possibly also an optimal positioning of different or differently sized mobile terminals on the supporting surface 7. As indicated in FIGS. 1 to 4, the outer side of the housing 5 can also be designed to be "shell-shaped" (i.e., with raised edges).

The charging apparatus 1 includes a heat sink 8 which is arranged in its housing 5. Heat sinks are well-known from the prior art and consist, similarly to the heat sink 8 used according to the disclosure, of a metal suitable for this purpose (aluminum, copper, cast iron, etc.). The heat sink 8 used according to the disclosure can furthermore include cooling ribs 13, cooling fins and/or cooling pins known from the prior art (see FIG. 5) which, in an installation state of the heat sink 8, are preferably arranged on a side of the heat sink 8 which faces away from the first control device 3.

The size of the heat sink 8, its thickness and shape are not subject to a specific restriction, and, for example, for different requirements of the charging apparatus 1, different heat sinks 8 can be provided. The charging apparatus 1 can also include more than one heat sink 8.

By means of cooling ribs 13, cooling fins and/or cooling pins, it is not only possible to increase the surface of the heat sink 8 emitting the heat, but they can simultaneously also be used to ensure a predetermined distance of the underside of the main part of the heat sink 8 from the inner side of the housing 5. Furthermore, with cooling ribs 13/cooling fins, it is also possible to influence the flow pattern of the ambient air suctioned by the active air supply device 9.

Preferably, the heat sink 8 is arranged adjacent to the first control device 3, particularly preferably directly adjacent to the first control device 3, wherein one or more heat conducting elements (e.g., heat-conducting pad(s)) can also be arranged between the heat sink 8 and the first control device 3.

The arrangement of the heat sink 8 "below" the first control device 3, as is shown in FIGS. 1 to 3, is merely meant to be exemplary. For example, the heat sink 8 can also be arranged between the primary coil device 2 (which, for achieving a preferably high degree of effectiveness, is arranged regularly directly below or in the side of the housing 5, the outer side of which serves at least to some extent as the supporting surface 7 for the mobile terminal) and the first control device 3. As a result, the heat sink 8, if applicable (i.e., in case of a primary coil arrangement 2 arranged in the side of the housing 5, the outer side of which serves at least to some extent as the supporting surface 7 for the mobile terminal) can even be arranged directly adjacent to the inner surface of the side of the housing 5, the outer side of which serves at least to some extent as the supporting surface 7 for the mobile terminal. Both cases result in the advantage that heat emitted from a mobile terminal lying on the supporting surface 7 can reach the heat sink "via a short distance" or even "via a shortest possible distance," and a particularly good and efficient (passive and/or active) cooling of the mobile terminal can thus be achieved.

The active air supply device 9, which is associated with the heat sink 8, can be any active air supply device 9 suitable for the purpose according to the disclosure (i.e., electrical, electromechanical, electro-pneumatic, etc.), for example, one or more axial fans, one or more radial fans, one or more tangential fans, one or more synthetic jets, or any combination thereof.

It can be provided that the active air supply device 9 is (possibly detachably) fastened to the heat sink 8, e.g., by means of force-locking, form-locking and/or integral bonding (e.g., by means of screws, by means of screws and nuts, by means of split pins, rivets, clips, a bayonet joint, a solder connection, a welded joint, etc., or a combination thereof).

The active air supply device 9 is set up to supply the heat sink 8 actively at least also with ambient air which can flow through the at least one air entry opening 4. Due to the housing 5 and its design provided for the charging apparatus 1, it is possible that at least part of the air suctioned by the active air supply device 9 exits again through the at least one air exit opening 6.

As shown in FIGS. 1, 2, 3, and 5, the active air supply device 9 is preferably arranged in the at least one air entry opening 4 of the housing 5, wherein "in" also refers to aligning at least partially "before" or "behind" the air entry opening 4. As a result, it can be ensured that at least very predominantly only ambient air from outside the housing 5 is suctioned and guided to the heat sink 8.

According to the disclosure, it is provided that the active air supply device 9 is only activated (i.e., provided with electric current of a suitable intensity, voltage, and type), when and as long as a predetermined first limit temperature of the heat sink 8 is reached or exceeded. In order to make this possible, a temperature sensor device 10 (known from the prior art and suitable for the purpose according to the disclosure) for sensing the temperature of the heat sink 8 is associated with the heat sink 8, and the charging apparatus 1 has a second control device 11 that has a signal connection to the temperature sensor device 10 and is operatively coupled to the active air supply device 9. According to this embodiment, the second control device 11 is set up to activate the active air supply device 9, when and as long as a predetermined first limit temperature of the heat sink 8 is reached or exceeded. As a first limit temperature, a temperature, for example, of 40° C., 41° C., 42° C., 43° C., 44° C., or 45° C. can be prescribed.

According to the present disclosure, it is provided, as is shown schematically in FIG. 2, that the second control device 11 also has a signal connection to the first control device 3 and is set up to activate the active air supply device 9 only if, when or after the first limit temperature of the heat sink is reached or exceeded, wireless charging of an electrical energy store of a mobile terminal is also performed.

Naturally, the first control device 3, the second control device 11, and the active air supply device 9 have respective current supply lines. For reasons of clarity, they are not shown in the drawings. The housing 5 can also have a connecting device (socket), by means of which the charging apparatus 1 and the devices thereof to be supplied with electric current can be jointly connected to a power grid (e.g., a 12V or 24V on-board power supply of a motor vehicle 16). For reasons of clarity, such a connecting device is also not shown in the drawings.

As was already explained above, during a wireless charging of an electric energy store of a mobile terminal, a comparatively high quantity of lost heat can be generated which results in a more intense heating of the mobile terminal and possibly also the charging apparatus 1. In this example, it can frequently be sufficient to base the activation of the active air supply device 9 (even when the first limit temperature is reached or exceeded) on the fact that such a charging process is in progress.

The charging apparatus 1 can also be developed such that the second control device 11 is set up to again deactivate the air supply device 9 only, when a predetermined second limit temperature of the heat sink 8, which is lower than the first limit temperature, is reached or undercut.

A temperature which is 5° C., 6° C., 7° C., 8° C., 9° C., or 10° C. lower than the first limit temperature can be predetermined as the second limit temperature. Proceeding from the first limit temperatures stated above by way of example, a value in the range from 30° C. to 40° C., e.g., a value of 35° C., can, for example, be predetermined for the second limit temperature.

According to this embodiment, it will be regularly necessary to operate the active air supply device 9 longer than would be necessary if the active air supply device 9 were already to be deactivated as soon as the first limit temperature is undercut again. On the other hand, by taking into consideration a second (lower) limit temperature, a greater cooling of the charging apparatus 1 and thus also of a mobile terminal located on the supporting surface 7 of the charging apparatus 1 can be achieved than without such a consideration.

Advantageously, the charging apparatus 1 can also have a presence sensor 21 (see FIG. 3) which is set up to determine whether an object is located on the supporting surface 7 of the housing 5, and which has a signal connection to the second control device 11.

The presence sensor 21 can be any "sensor" device, with which the presence of an object on the supporting surface 7 can be determined. For example, in a simple case, the presence sensor 21 can be designed as an electromechanical presence sensor arranged in the supporting surface 7 and which is actuated (closed or opened), when an object is placed on it or borne against it. Further examples for a presence sensor 21 suitable for the present disclosure are, but not exclusively, a light barrier, an optical image acquisition and evaluation system, an inductive, capacitive, infrared or ultrasound presence sensor, an inductive, capacitive, infrared or ultrasound motion sensor, etc.

Inherently, motion sensors—as the name implies—can only detect motions. However, if a movement process of an object is detected in the direction of the supporting surface 7, and no subsequent movement process of the object away from the supporting surface 7 can be detected, this circumstance can be used to assume that the object is actually located on the supporting surface 7. The reverse applies, when a movement process of the object away from the supporting surface 7 is detected.

If a presence sensor 21 is provided for the charging apparatus 1, the second control device 11 can be set up to not activate or to deactivate the active air supply device 9, when or as soon as the presence sensor 21 detects that no object (therefore also no mobile terminal) is located on the supporting surface 7.

This non-activation or the deactivation of the active air supply device 9 can take place independently from the temperature of the heat sink 8, for example, even if the temperature of the heat sink 8 has reached or exceeded the first limit temperature.

For example, if a driver in a stationary (motor) vehicle intends to use the mobile terminal and removes (lifts) it for that purpose from the charging apparatus 1, a (further) operation of the active air supply device 9—at least with regard to the mobile terminal—is not (or no longer) beneficial because the mobile terminal can naturally no longer be cooled by the ambient air emitted from the air exit opening 6 of the housing 5.

In this example, the active air supply device 9 can in such a case be deactivated in order to prevent, e.g., a noise emission by the operation of the air supply device 9 and the flow of the ambient air. Such a noise emission can be perceived as disturbing during the use of the mobile terminal (e.g., during a phone call).

In the charging apparatus 1, the at least one air exit opening 6 is advantageously arranged in a predetermined edge area R of the side of the housing 5, the outer side of which serves at least to some extent as the supporting surface 7 for the mobile terminal, such that the at least one air exit opening 6 in an installation state of the housing 5 is offset by a predetermined distance value A horizontally with regard to the part of the first control device 3 that comes closest to the at least one air exit opening 6.

The edge area R can be defined in any suitable manner and be approximately 5%, 10%, 15%, or 20% of the length or/or width of the side of the housing 5, the outer side of which serves at least to some extent as the supporting surface 7 for the mobile terminal. In FIG. 1, an exemplary edge area R is indicated.

It can be assumed that the charging apparatus 1 according to the disclosure is arranged in the gap between the front seats of a motor vehicle 16 such that the supporting surface 7 for the mobile terminal in an installation state at a horizontally aligned motor vehicle 16 also extends essentially horizontally. In such case, it cannot be precluded that, caused by a passenger of the motor vehicle 16, for example, mineral water or a different beverage is spilled due to carelessness, the beverage reaches the supporting surface 7 of the charging apparatus 1, and from there penetrates the housing 5 of the charging apparatus 1 through the at least one air exit opening 6.

If, according to the last-mentioned development, a sufficiently large horizontal distance between the at least one air exit opening 6 and the part of the first control device 3 that comes closest to the at least one air exit opening 6 is provided in an installation state, the liquid penetrating the housing 5 of the charging apparatus 1 will not reach the area of the first control device 3 and, particularly if the at least one air entry opening 4 is provided in the bottom area of the housing 5, can be diverted downward through the air entry opening 4. As a result, damage to the charging apparatus 1 caused by a penetrating liquid can in many cases be prevented.

Corresponding considerations also apply to the second control device 11, provided that it is arranged within the housing 5 of the charging apparatus 1, as shown in FIGS. 1 to 3. In such case, a person skilled in the art will select the positioning of the at least one air exit opening 6 such that in case of liquid penetrating in an installation state, neither the first control device 3 nor the second control device 11 will be damaged.

The arrangement of the second control device 11 within the housing 5 of the charging apparatus 1 shown in FIGS. 1 to 3 is by no means obligatory, and the second control device 11 can naturally also be arranged outside the housing 5 of the first charging apparatus 1.

In the charging apparatus 1 according to the present disclosure, the at least one air exit opening 6 can be designed such that the flow direction of the air exiting through it has an acute angle relative to the supporting surface 7. This acute angle is not particularly delimited but lies preferably in the range from 0° (i.e., flow direction of the exiting air parallel to the surface of the supporting surface 7) and approximately 30°. It is thus ensured in a particularly simple manner that the exiting air flows at least to some extent into the gap formed by the supporting surface 7 and a mobile terminal lying on the supporting surface 7, irrespective of whether or not the surface of the mobile terminal lying on the supporting surface 7 covers the air exit opening 6.

A "rear ventilation" of a mobile terminal lying on the support surface 7 of the charging apparatus 1 can be achieved in a particularly safe manner if, as provided according to a further advantageous development of the disclosure, the supporting surface 7 has spacer elements 12 which ensure a predetermined distance between the supporting surface 7 and a supporting side of the mobile terminal.

The spacer elements 12 are not subject to specific limitations and can be designed, for example, in the form of struts (as shown, e.g. in FIG. 4), pin- or nub-shaped elevations, etc. The spacer elements 12 are preferably arranged on the supporting surface 7 such that as a result, a preferably extensively distributed air flow below a mobile terminal lying on the spacer elements 12 is achieved. A corresponding design of the at least one air exit opening 6 can also contribute to achieving this last-mentioned objective. As shown exemplary in FIG. 4, the at least one air exit opening 6, for example, can be designed to be elongated such that the exiting air exits the housing 5 of the charging apparatus 1 already over a large part of the width or length of a mobile terminal.

As shown in FIGS. 1-3 and 5, the charging apparatus 1 can optionally have a protective device 18, for example, in the form of a ventilation grille, with which the active air supply device 9 can be protected from mechanical damage, particularly prior to and during the installation in an installation shaft 17, and prior to and during the installation, for example, in a (motor) vehicle 16.

As can be seen in FIG. 5, the housing 5 of the charging apparatus 1 can not only have at least one air entry opening 4 and at least one air exit opening 6 but also at least one further opening 19.

At least one such opening 19 (and possibly a corresponding opening in an installation shaft 17) can be advantageous particularly when, as is shown in FIG. 5, at least on some parts of the surface that faces the bottom of the housing 5, the heat sink 8 has cooling ribs 13, cooling fins and/or cooling pins. In case of a non-activated air supply device 9, it is easier to emit heat from the heat sink 8 via the cooling ribs 13, cooling fins and/or cooling pins through the at least one further opening 19 to the environment of the charging apparatus 1 than would be the case with a bottom of the housing 5 which is closed except for the at least one air entry opening 4.

According to a further embodiment of the present disclosure, as shown exemplary in FIG. 3, the charging apparatus 1 can further include a mobile communications antenna device 14 which is arranged in the housing 5 or which can be an element of the side of the housing 5, the outer side of which serves at least to some extent as the supporting surface 7 for the mobile terminal. By means of such a mobile communications antenna device 14, signals from the mobile communications antenna device of a mobile terminal located on the supporting surface 7 of the charging apparatus 1 can be wirelessly received and, for example, transmitted to the roof antenna 20 of a motor vehicle 16, and vice versa. As a result, the mobile communications reception of a mobile terminal located on the supporting surface 7 of the charging apparatus 1 can be improved, when compared to a charging apparatus 1 without such a mobile communications antenna device 14.

According to a further embodiment of the present disclosure, the charging apparatus 1 can include an associated microphone device 15 (known from the prior art and suitable for the purpose according to the disclosure) for detecting the volume in an environment of the charging apparatus 1, and the second control device 11 can have a signal connection to the microphone device 15 and be set up to control the active air supply device 9 also on the basis of the volume in the environment of the charging apparatus 1.

In the charging apparatus 1 shown exemplarily in FIG. 3, the mobile communications antenna device 14, the microphone device 15, and the presence sensor 21 are present cumulatively. Naturally, it is also possible in the charging apparatus 1 according to FIG. 3 that only one or two of these devices are present. One, two, or all three of the devices can also be provided in the embodiment shown in FIG. 1. The same naturally also applies to all advantageous developments and embodiments of the charging apparatus 1.

The operation of the active air supply device 9 and the associated flows of the air suctioned into the housing 5 by the active air supply device 9 and exiting from the air exit opening 6 will regularly be associated with a certain noise generation. In an environment with an otherwise very low noise level (e.g., in a top-of-the-range motor vehicle), this can be perceived as disturbing. The same applies, for example, to a vehicle with a deactivated internal combustion engine (e.g., vehicles with a "start-stop function" and a stop at a traffic light, or in a traffic jam).

Against this background, it can be provided according to the present disclosure that, in the event that the microphone device 15 detects only a very low noise level in an environment of the charging apparatus 1, the active air supply device 9 is deactivated by the second control device 11 or operated with non-maximum power. It can also be provided that the active air supply device 9 is controlled on the basis of the noise level in the environment of the charging apparatus 1 such that the higher the noise level in an environment of the charging apparatus 1, the greater the power with which the air supply device 9 can be operated. For determining the noise level in the environment of the charging apparatus 1 and for controlling the charging apparatus 1, the noise portion caused by the possibly already given operation of the air supply device 9 can be "subtracted" accordingly.

Furthermore, it can be provided that the more the first limit temperature is exceeded, the more power can be used to operate the air supply device 9.

The present disclosure also includes a vehicle 16, particularly a motor vehicle 16, having a charging apparatus 1 according to the present disclosure or one of its advantageous developments and embodiments.

Even though the present disclosure was very predominantly described in connection with mobile terminals, the electric energy store of which is wirelessly chargeable, it must be expressly noted that the charging apparatus 1 according to the disclosure and its advantageous developments and embodiments can naturally also be used in connection with mobile terminals that are not wirelessly chargeable.

For example, if a mobile terminal without a wireless charging function is located on the supporting surface 7 of the housing 5, and if the mobile terminal is greatly or extremely loaded, e.g. by one or more programs (e.g., a navigation program) running on the mobile terminal, the result is a great heating of the mobile terminal.

A portion of this waste or lost heat of the mobile terminal lying on the supporting surface 7 is transferred to and can be discharged by the heat sink 8. If the temperature sensor device 10 determines that a first limit temperature of the heat sink 8 is reached or exceeded, the active air supply device 9 can—without being included in the present disclosure—also be activated, thus actively cooling both the heat sink 8 and the mobile terminal without a wireless charging function.

The invention claimed is:

1. A charging apparatus for wirelessly charging a rechargeable electrical energy store of a mobile terminal, comprising:
    a primary coil device configured to generate an alternating magnetic field;
    a first control device, wherein the first control device is operatively connected to the primary coil device, and configured to control an intensity and duration of the alternating magnetic field;
    a housing, wherein the housing comprises:
        an air entry opening and an air exit opening, wherein the air exit opening of the housing is arranged in a side of the housing; and
        an outer side, wherein the outer side serves as a supporting surface for the mobile terminal, and is configured to guide air flowing from the housing of the charging apparatus in a direction of the mobile terminal lying on the supporting surface;
    a heat sink, comprising:
        an air supply device configured to actively supply the heat sink with ambient air that can flow in through the air entry opening; and
        a temperature sensor device, configured to sense a temperature of the heat sink; and
    a second control device, comprising:
        a signal connection to the temperature sensor device and the first control device,
        wherein the second control device is configured to activate the air supply device if a predetermined first limit temperature of the heat sink has been reached or exceeded, and wireless charging of the rechargeable electrical energy store of the mobile terminal is performed.

2. The charging apparatus of claim 1, wherein the second control device is further configured to deactivate the air supply device when a predetermined second limit temperature of the heat sink, which is lower than the predetermined first limit temperature, is reached or undercut.

3. The charging apparatus of claim 1, further comprising:
    a presence sensor, which is configured to determine whether an object is present on the supporting surface of the housing, and which has a signal connection to the second control device.

4. The charging apparatus of claim 3, wherein the second control device is further configured to not activate the air supply device or to deactivate it when the presence sensor senses that no object is present on the outer side of the housing.

5. The charging apparatus of claim 1, wherein the air supply device is arranged in the air entry opening of the housing.

6. The charging apparatus of claim 1, wherein the air exit opening is further arranged in a predetermined edge area of the side of the housing, to be offset horizontally by a predetermined distance value with regard to a part of the first control device that comes closest to the air exit opening.

7. The charging apparatus of claim 1, wherein the air exit opening is configured such that a flow direction of the air exiting from the air exit opening has an acute angle relative to the supporting surface.

8. The charging apparatus of claim 1, wherein the supporting surface comprises spacer elements which ensure a predetermined distance between the supporting surface and a supporting side of the mobile terminal.

9. The charging apparatus of claim 1, wherein the heat sink comprises cooling ribs, cooling fins, or cooling pins which, in an installation state of the heat sink, are arranged on a side of the heat sink which faces away from the first control device.

10. The charging apparatus of claim 1, wherein the primary coil device is installed adjacent to the first control device or is a first element of the side of the housing, the charging apparatus further comprising:
    a mobile communications antenna device and an associated microphone device for detecting a volume in an environment of the charging apparatus,
    wherein the mobile communications antenna device is arranged in the housing or is a second element of the side of the housing, and
    the second control device further comprises a signal connection to the associated microphone device, the second control device further configured to control the air supply device on the basis of the volume in the environment of the charging apparatus.

* * * * *